Figure 1:
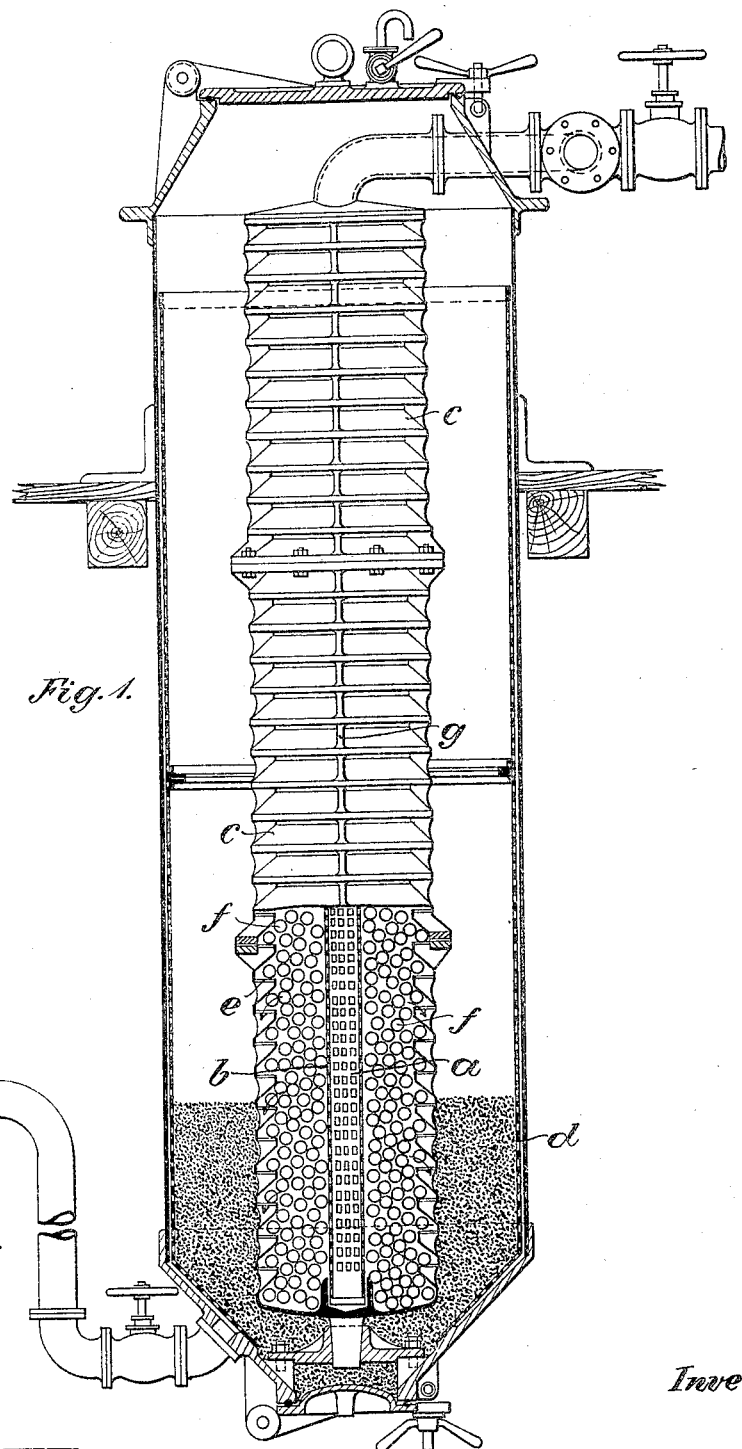

No. 807,513. PATENTED DEC. 19, 1905.
G. STADE.
DEVICE FOR FILTERING LIQUIDS.
APPLICATION FILED FEB. 23, 1904.

2 SHEETS—SHEET 1.

Witnesses
Franz Tielcke

Inventor
Geo. Stade

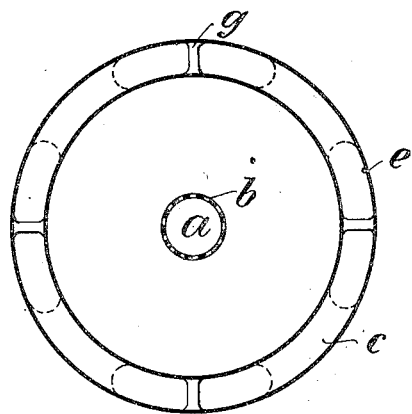
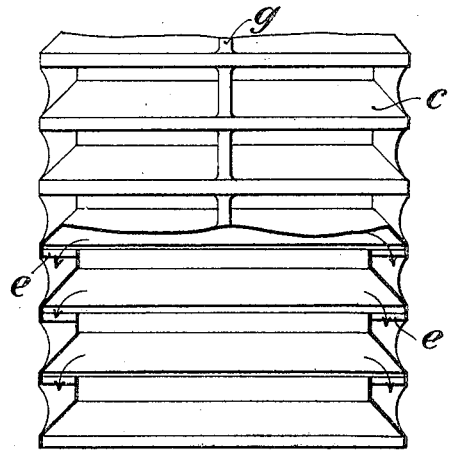

UNITED STATES PATENT OFFICE.

GEORGE STADE, OF BERLIN, GERMANY.

DEVICE FOR FILTERING LIQUIDS.

No. 807,513.           Specification of Letters Patent.           Patented Dec. 19, 1905.

Application filed February 23, 1904. Serial No. 194,856.

*To all whom it may concern:*

Be it known that I, GEORGE STADE, civil engineer, a subject of the German Emperor, residing at 4/5 Nicolaikirchplatz, in the city of Berlin, Kingdom of Prussia, German Empire, have invented a certain new and useful Device for Filtering Liquids, of which the following is a specification.

This invention has reference to devices for filtering liquids.

The sand-filters, or, more properly speaking, sand-column filters, of well-known construction which, as heretofore constructed, operate by means of conically-tapering ring-shaped inclosures and by the utilization of the natural angle of inclination present the inconvenience that the height of the filters or the pressure of the material to be filtered are more or less limited. A sudden rather great change of the pressure produces immediately a turbidity in the filtrate and very frequently the filtering material in the case of an unforeseen change of pressure is also washed out from the rings and sometimes causes very serious disturbances in the operation of the filter in view of the pipes and the valves becoming filled with sand. A constant level of pressure cannot be obtained in a great many cases, and especially in the case of very high pressures. The satisfactory run of the filter depends chiefly on the exceedingly difficult accurate adjustment of the main admission-valve.

The invention about to be described consists chiefly in the fact that the material to be filtered—such as water, for instance—is not directed in a straight course upon the inclines of the filtering material, such as sand; but instead of that it is first caused to describe an angle which forces it against a solid body—such as a partition of the filtering element, for instance. This resistance breaks the force of the forwardly-rushing current of water, which becomes distributed in such a manner that the inclined face of the filtering material is prevented from supporting the chief pressure at one single place only, as heretofore; but this pressure is evenly distributed over the entire surface of the incline. Hence a suddenly-occurring change of pressure will not be able to produce a turbidity in the filtrate, as this change of pressure, which likewise does not work on a single place of the incline, is unable to throw off filtering material from the incline; but it only forces back into itself, so to speak, the whole surface of the incline, so that when the normal pressure is resumed the resiliency of the filtering material is sufficient to restore the same unchanged into its former position. The angle described by the water during its movement toward the incline can be produced by the rings which serve for the formation of the filtering elements instead of tapering down straightly conical, constituting certain angles and overlying each other, as shown on the accompanying drawings, the inclines of the filtering material being for the most part concealed between these angles and being protected by the overlapping parts.

Another part of the invention consists in arranging in the interior of the filtering element a centrally-positioned admission-pipe which is provided with perforations all around, so that the pressure of the liquid which is to be filtered is at once spread uniformly over the entire exposed filtering-surface, while in the constructions heretofore known the liquid to be filtered is discharged at the bottom as a solid jet by washing the sand out from below. Furthermore, the arrangement is of essential importance that between the discharge-openings of the liquid to be filtered and between the angle of incline of the filtering material an intermediate layer of bodies acting as abutments are inserted, which are preferably globular or oval-shaped and which, though they admit of the free passage of the liquid to be filtered, yet deflect a sudden shock of this liquid or weaken the same, so as to contribute also to the saving of the inclined face of the filtering material.

The annexed drawings represent an embodiment of the invention, the apparatus representing, however, only an instance of carrying the invention into effect.

In the drawings, Figure 1 is a vertical section. Fig. 2 is a top plan view of one of the rings with the central admission-tube shown in section. Fig. 3 is a partial section of a number of rings shown on an enlarged scale.

*a* is the centrally-arranged admission-pipe, preferably closed at the bottom and being preferably provided with perforations *b* preferably for its whole length and on its entire periphery. The pipe *a* is rigidly secured in the cover of the casing.

The filtering body or element consists, mainly, of ring-shaped bodies *c*, which, as shown particularly in Fig. 3 of the drawings, are not tapering down conically for the whole extent of their surfaces; but their conical faces are provided with angles, so as to produce overlapping parts, by means of which the natural angles of incline of the filtering material are protected. The filtering material $d$ consists, as already mentioned, preferably of sand. The filtering elements present on the side facing the sand the concealed, and therefore protected, exposed filtering-surfaces. The liquid to be filtered escapes from the filtering element through the perforations $e$ and in the direction of the arrow. The ring-shaped bodies $c$ are also provided with supporting-stays $g$. The ring-shaped cavity between the filtering element and the admission-tube $a$ is filled with balls $f$ or other layers against which the current of liquid impinges. These bodies may consist of glass, porcelain, quartz, or of other suitable material. If the abutment or impinging layers are made up of balls, the latter may be round, oval, or otherwise suitably formed. It is, however, necessary to leave sufficiently large spaces between the balls and the like to allow of the coarse solid constituents contained in the filtering liquid passing unimpeded through the abutment layers and through the openings $e$ and into the filtering-sand.

The form of construction herein shown represents a filter in which the liquid which passes through the sand is flowing with its velocity reduced from the inside toward the outside; but it is evident that the arrangement of the parts may also be the reverse.

What I claim, and desire to secure by Letters Patent of the United States, is—

1. In a filtering apparatus, the combination with an outer perforated mantle and an inner perforated pipe of comparatively small diameter of liquid ingress and egress pipes connecting respectively with the inner perforated pipe and with the outer mantle, a series of superimposed, spaced flat tubular members of equal diameter with partly conical and partly straight vertical walls and outwardly horizontally bent, open-ring-shaped upper rim, said members being intermediate between said inner pipe and said outer mantle.

2. In a filtering apparatus, the combination with an inner perforated vertical pipe of relatively small diameter and a surrounding outer perforated mantle or tubular casing of relatively large diameter, of ingress and egress pipes connected respectively to the top of said inner perforated pipe and to the bottom of said outer perforated mantle, a series of vertically superimposed, spaced, short, tubular members of equal diameter with partly conical and partly straight vertical walls and outwardly-extending horizontal, open-ring-shaped upper part.

3. In a filtering apparatus, the combination with an inner perforated vertical pipe of relatively small diameter and a surrounding outer perforated tubular casing of relatively large diameter, of liquid admission and discharge pipes connecting respectively with the inner perforated pipe and with the outer tubular casing, a column of intermediate superimposed, spaced, flat tubular members of equal diameter and with partly conical and partly straight side walls and outwardly-extending, open-ring-shaped rim, current-impinging and impact-breaking bodies, arranged between the inner pipe and said intermediate column of tubular members, and filtering material between said column and said surrounding outer tubular casing.

4. In a filtering apparatus, the combination with an inner perforated pipe of relatively small diameter and a surrounding outer perforated tubular casing of relatively large diameter, of liquid admission and discharge pipes connecting respectively with the inner perforated pipe and with the outer tubular casing, an intermediate column of superimposed, spaced, short tubular members of substantially equal diameter and with partly conically inclined and partly straight side walls and with outwardly-extending, open-ring-shaped rim, balls loosely arranged between the inner pipe and the said intermediate column, and filtering material between said column and said surrounding outer tubular casing.

In witness whereof I have hereunto set my hand in presence of two witnesses.

GEO. STADE.

Witnesses:
WOLDEMAR HAUPT,
HENRY HASPER.